(12) United States Patent
Evans et al.

(10) Patent No.: US 8,092,756 B2
(45) Date of Patent: Jan. 10, 2012

(54) CATALYST WITHDRAWAL APPARATUS AND METHOD FOR REGULATING CATALYST INVENTORY IN A UNIT

(75) Inventors: Martin Evans, Tolland, CT (US); Charles Radcliffe, Langwathby (GB)

(73) Assignee: Intercat Equipment, Inc., Sea Girt, NJ (US)

(*) Notice: Subject to any disclaimer, the term of this patent is extended or adjusted under 35 U.S.C. 154(b) by 367 days.

(21) Appl. No.: 12/365,538

(22) Filed: Feb. 4, 2009

(65) Prior Publication Data
US 2009/0196799 A1 Aug. 6, 2009

Related U.S. Application Data

(60) Provisional application No. 61/026,343, filed on Feb. 5, 2008.

(51) Int. Cl.
| | |
|---|---|
| B01J 19/00 | (2006.01) |
| F27B 15/14 | (2006.01) |
| F27B 15/08 | (2006.01) |
| F27B 15/00 | (2006.01) |
| F28F 27/00 | (2006.01) |
| G05B 1/00 | (2006.01) |
| G05D 7/00 | (2006.01) |
| G05D 16/00 | (2006.01) |

(52) U.S. Cl. ........ 422/232; 422/105; 422/110; 422/111; 422/112; 422/113; 422/129; 422/139; 422/140; 422/144; 422/147; 422/198; 422/211; 165/96

(58) Field of Classification Search .......... 422/232, 422/144, 500, 139, 147, 119, 145, 105, 110–113, 422/129, 140, 198, 211; 165/96, 157
See application file for complete search history.

(56) References Cited

U.S. PATENT DOCUMENTS

| | | | |
|---|---|---|---|
| 5,389,236 A | 2/1995 | Bartholic et al. | |
| 5,810,045 A * | 9/1998 | Evans | 137/312 |
| 6,859,759 B2 | 2/2005 | Evans | |
| 2005/0106080 A1 | 5/2005 | Evans et al. | |
| 2007/0020154 A1 | 1/2007 | Evans | |
| 2010/0058879 A1* | 3/2010 | Evans et al. | 73/863.11 |

OTHER PUBLICATIONS

PCT international search report and written opinion of PCT/US2009/033068 dated Aug. 10, 2010.
PCT international search report and written opinion of PCT/US2009/033068 dated Sep. 22, 2009.

* cited by examiner

*Primary Examiner* — Walter Griffin
*Assistant Examiner* — Natasha Young
(74) *Attorney, Agent, or Firm* — Kevin M. Carroll

(57) ABSTRACT

Catalyst withdrawal apparatuses and methods for regulating catalyst inventory in one or more units are provided. In one embodiment, a catalyst withdrawal apparatus for removing catalyst from a FCC unit includes a vessel coupled to a flow control circuit. Another embodiment of a catalyst withdrawal apparatus includes a vessel, a delivery line, and control valve. The control valve is configured to control the amount of gas to the delivery line and entrained with the catalyst. Another embodiment of catalyst withdrawal apparatus includes a vessel coupled to a heat exchanger. The heat exchanger includes a first conduit; a housing confining a coolant volume around a portion of the first conduit; and a sliding seal sealing the housing to the first conduit in manner that allows longitudinal expansion. A fluid catalyst cracking system coupled to a catalyst withdrawal apparatus and method for withdrawing catalyst from a unit are also disclosed.

23 Claims, 4 Drawing Sheets

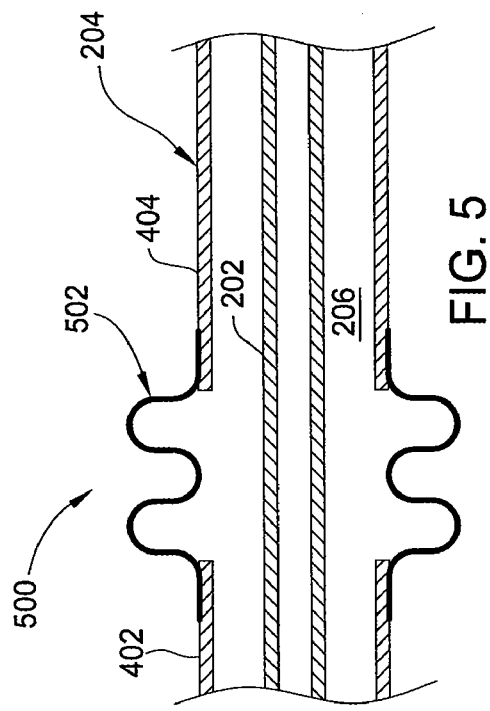
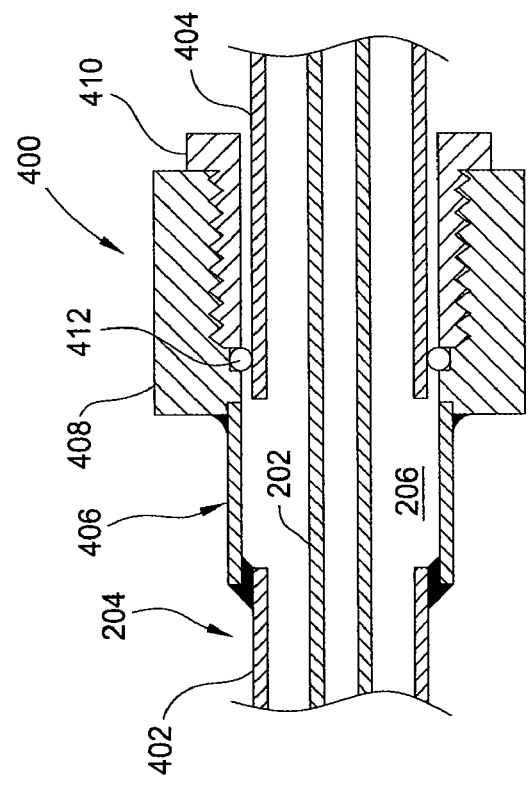
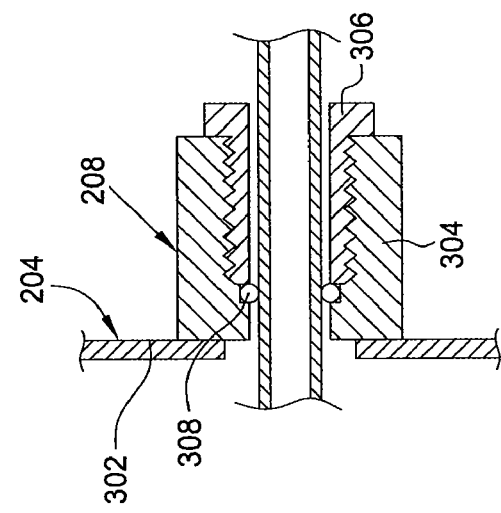

CATALYST WITHDRAWAL APPARATUS AND METHOD FOR REGULATING CATALYST INVENTORY IN A UNIT

CROSS REFERENCE TO RELATED APPLICATIONS

This application claims benefit of U.S. Provisional Patent Application Ser. No. 61/026,343, filed Feb. 5, 2008, which is incorporated by reference in its entirety.

BACKGROUND

1. Field of the Invention

Embodiments of the invention include a catalyst withdrawal apparatus and method for regulating catalyst inventory in one or more units. Particularly, the invention includes embodiments directed to catalyst withdrawal apparatus and method for regulating catalyst inventory in one or more fluid catalytic cracking units.

2. Description of the Related Art

A fluid catalytic cracking system generally includes a fluid catalytic cracking unit (FCCU) coupled to a catalyst injection system that maintains a continuous or semi continuous addition of fresh catalyst to the inventory circulating between a regenerator and a reactor.

During the catalytic process, there is a dynamic balance of the total catalyst within the FCC unit. For example, catalyst is periodically added utilizing the catalyst injection system and some catalyst is lost in various ways such as through the distillation system, through the effluent exiting the regenerator, etc.

If the amount of catalyst within the FCC unit diminishes over time, the performance and desired output of the FCC unit will diminish, and the FCC unit will become inoperable. Conversely, if the catalyst inventory in the FCC unit increases over time or becomes deactivated, the catalyst bed level within the regenerator reaches an upper operating limit and the deactivated or excess catalyst is withdrawal to prevent unacceptably high catalyst emissions into the flue gas stream, or other process upsets.

Thus, there is a need for a catalyst withdrawal apparatus suitable for use with a fluid catalytic cracking catalyst unit.

SUMMARY

The purpose and advantages of embodiments of the invention will be set forth and apparent from the description of exemplary embodiments that follows, as well as will be learned by practice of the embodiments of the invention. Additional advantages will be realized and attained by the methods and systems particularly pointed out in the written description and claims hereof, as well as from the appended drawings.

An embodiment of the invention provides a catalyst withdrawal apparatus for removing catalyst from at least a unit. The catalyst withdrawal apparatus includes a vessel and a flow control circuit. The vessel is suitable for high temperature operation and has an inlet coupled to the unit and an outlet. The flow control circuit is configured to dynamically regulate backpressure within the vessel.

A second embodiment of the invention provides a catalyst withdrawal apparatus for removing catalyst from at least a unit. The catalyst withdrawal apparatus includes a vessel, a delivery line, and, and control valve. The vessel is suitable for high temperature operation and has an inlet coupled to the unit and an outlet. The delivery line is coupled to the inlet for delivering catalyst to the vessel. The control valve is configured to control the amount of gas to the delivery line and entrained with the catalyst.

A third embodiment provides catalyst withdrawal apparatus for removing catalyst from at least a unit. The catalyst withdrawal apparatus includes a vessel and a heat exchanger coupled to the vessel. The vessel is suitable for high temperature operation and has inlet coupled to the unit and outlet. The heat exchanger includes a first conduit; a housing confining a coolant volume around at least a portion of the first conduit; and a sliding seal sealing the housing to the first conduit in a manner that allows the first conduit to expand longitudinally relative to the housing.

A fourth embodiment provides a fluid catalyst cracking system. The fluid catalytic cracking system includes at least a fluid catalyst cracking unit (FCCU) and a catalyst withdrawal apparatus coupled to the FCCU. The catalyst withdrawal apparatus is configured to provide a metric of the amount of catalyst removed from the FCCU and is coupled to at least one member selected from the group consisting of heat exchanger, flow control circuit, control valve and combinations thereof.

A fifth embodiment provides a method. The method includes withdrawing catalyst from at least a unit to a vessel by one or more steps selected from the group consisting of heat exchanging with a heat exchanger, regulating back pressure with a flow control circuit, and regulating amount of gas with a control valve configured to control the amount of gas to the delivery line and entrained with the catalyst; and measuring the amount of catalyst withdrawn from the at least a unit into the vessel.

A sixth embodiment provides a heat exchanger. The heat exchanger includes a first conduit; a housing confining a coolant volume around at least a portion of the first conduit; and a sliding seal sealing the housing to the conduit in a manner that allows the first conduit to expand longitudinally relative to the housing.

BRIEF DESCRIPTION OF THE DRAWINGS

The accompanying figures, which are incorporated in and constitute part of this specification, are included to illustrate and provide a further understanding of the method and system of the invention. Together with the description, the drawings serve to explain the principles of the invention.

FIG. 3 is schematic diagram of a heat exchanger in accordance with an embodiment of the present invention;

FIG. 4 is another schematic diagram of a heat exchanger with a seal in accordance with an embodiment of the present invention;

FIG. 5 is another schematic diagram of a heat exchanger with a seal in accordance with an embodiment of the present invention.

Figure 1:
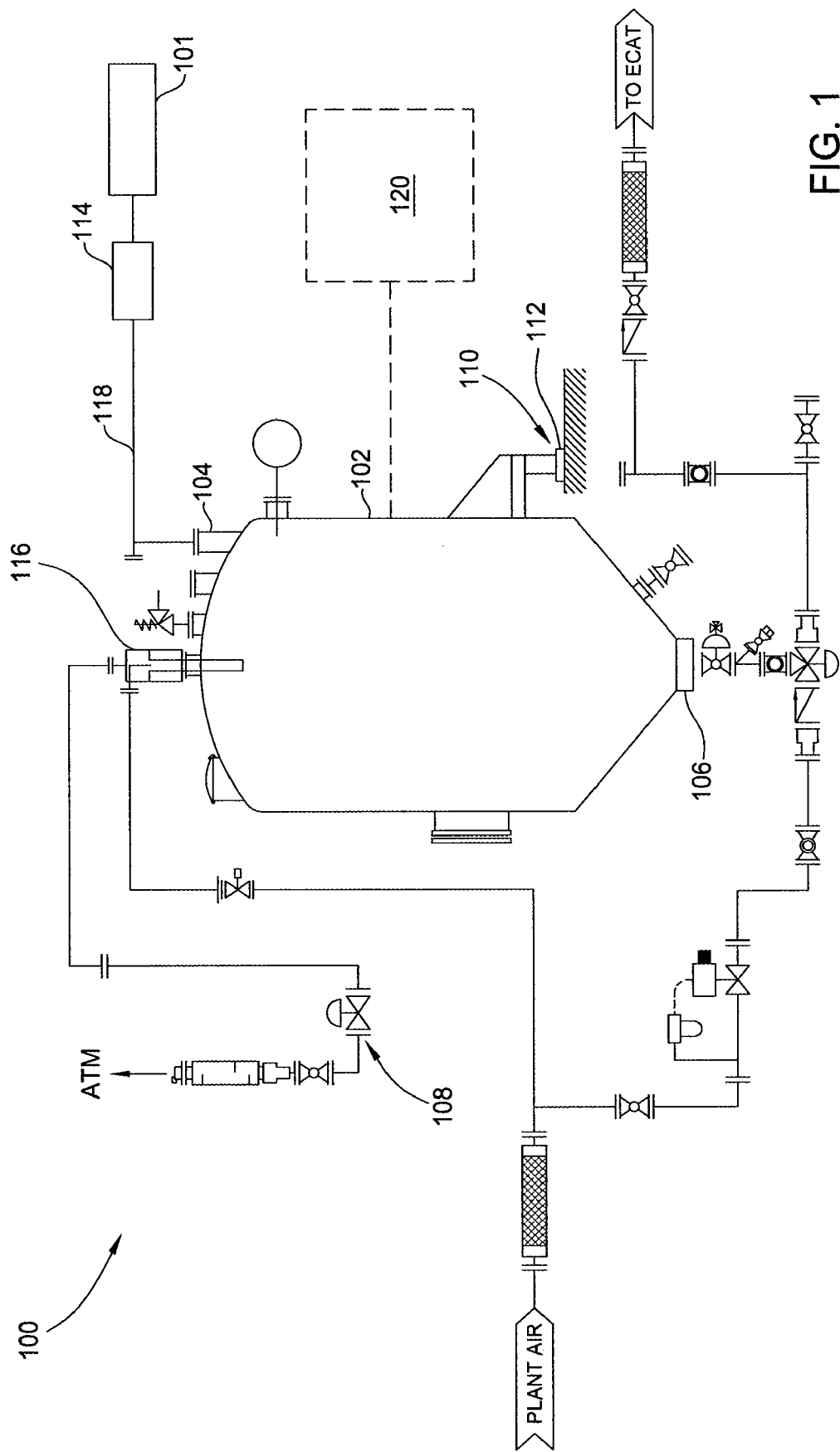
FIG. 1 is a schematic diagram of a fluid catalytic cracking system having a catalyst withdrawal apparatus in accordance with an embodiment of the present invention.

To facilitate understanding, identical reference numerals have been used, where possible, to designate identical elements that are common to the figures, except that suffixes may be added, when appropriate, to differentiate such elements. The images in the drawings are simplified for illustrative purposes and are not depicted to scale. It is contemplated that features or steps of one embodiment may be beneficially incorporated in other embodiments without further recitation.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms.

Reference will now be made in detail to exemplary embodiments of the invention which are illustrated in the accompanying figures and examples. Referring to the drawings in general, it will be understood that the illustrations are for describing a particular embodiment of the invention and are not intended to limit the invention thereto.

Whenever a particular embodiment of the invention is said to comprise or consist of at least one element of a group and combinations thereof, it is understood that the embodiment may comprise or consist of any of the elements of the group, either individually or in combination with any of the other elements of that group. Furthermore, when any variable occurs more than one time in any constituent or in formula, its definition on each occurrence is independent of its definition at every other occurrence. Also, combinations of substituents and/or variables are permissible only if such combinations result in stable compounds.

FIG. 1 is a schematic representation of an embodiment of a catalyst withdrawal apparatus 100 for removing one or more types of catalyst from one or more units 101. The catalyst withdrawal apparatus 100 includes one or more vessels 102 and one or more flow control circuits 108. The vessel 102 is suitable for high temperature operation and has one or more inlets 104 coupled to the unit and one or more outlets 106. The flow control circuit 108 is configured to dynamically regulate backpressure within the vessel 102 to control the flow of catalyst into the vessel 102 from the unit 101. In one embodiment, an advantage of positioning the flow control circuit 108 downstream of the vessel 102 includes, but is not restricted to, isolating the components of the flow circuit 108 from the abrasive materials (e.g., catalyst) exposure to which would degrade the performance of the flow circuit components and require more costly flow circuit components.

In one embodiment, the vessel 102 is suitable for receiving catalyst at a temperature in excess of about 600° C. (1112° F.). In another embodiment, the vessel 102 is suitable for receiving catalyst which has a temperature in a range from about 600° C. (1112° F.) to about 850° C. (1562° F.). In yet another embodiment, the vessel 102 is suitable for receiving catalyst having a temperature in excess of about 800° C. (1472° F.). In yet another embodiment, the vessel 102 comprises a pressure vessel. For example, the pressure vessel is pressurizable from about 5 to about 125 pounds per square inch (about 0.35 to about 8.5 kg/cm$^2$) during withdrawal operations. Intermittently, the vessel 102 may be vented to about atmospheric pressure.

Figure 2:
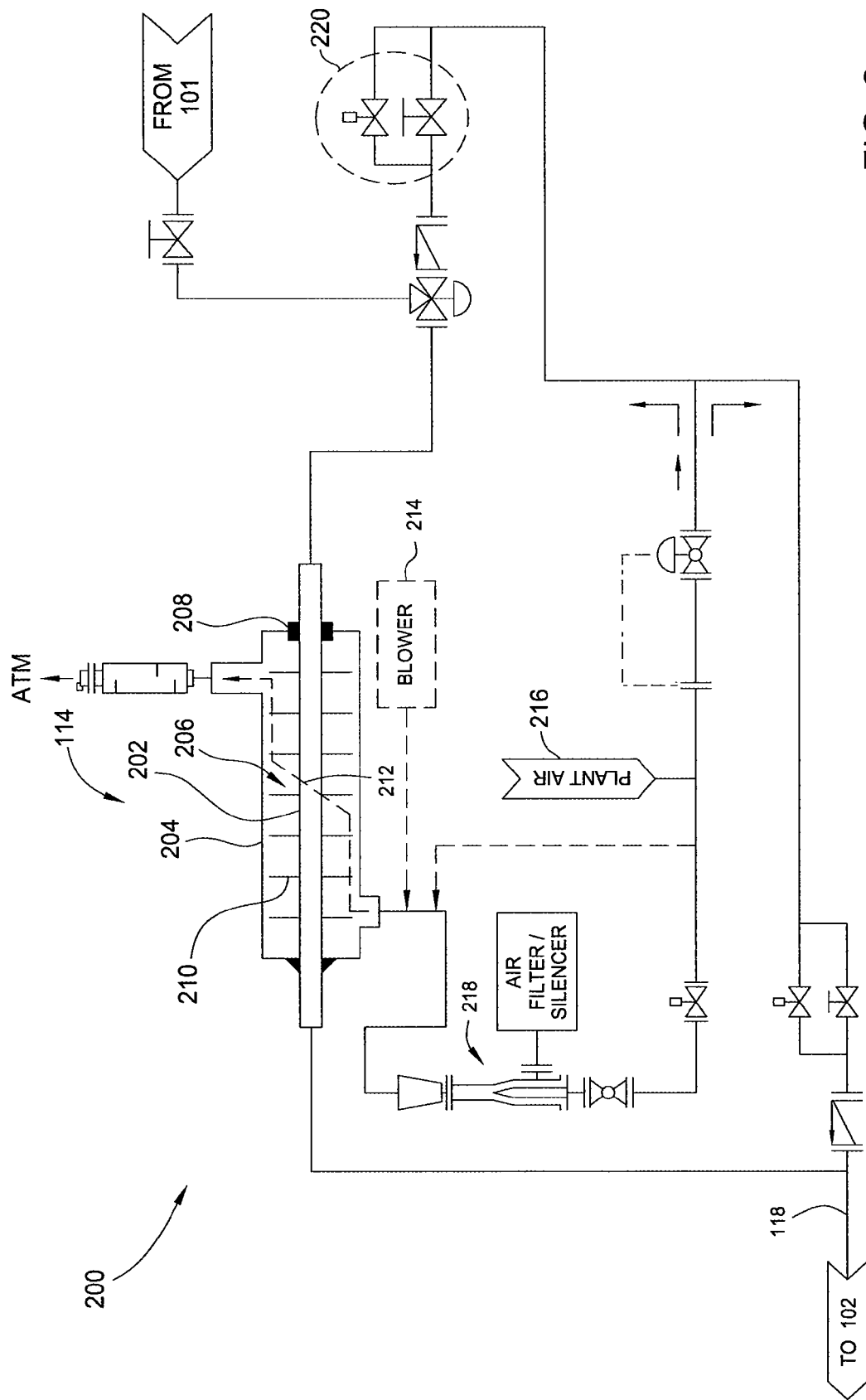
FIG. 2 is a schematic diagram detailing a portion of the catalyst withdrawal apparatus of FIG. 1 in accordance with an embodiment of the present invention.

In another embodiment, as depicted in FIG. 2, the catalyst withdrawal apparatus 200 includes one or more heat exchangers 114 coupled between the vessel 102 and the unit 101. The heat exchanger 114 includes a first conduit 202; a housing 204 and a sliding seal 208. The housing confines a coolant volume 206 around at least a portion of the first conduit 202 and the sliding seal 208 seals the housing 204 to the first conduit 202 in a manner that allows the first conduit 202 to expand longitudinally relative to the housing 204. Catalyst flows between the unit 101 and the vessel 102 via the conduit 202 and a coolant is circulated through the coolant volume 206 defined between the first conduit 202 and the housing 204 to extract heat from the catalyst in the first conduit 202.

In one embodiment, the first conduit 202 of the heat exchanger is substantially non-tortuous and substantially free of bends or curves. It should be noted that some bends or curves may exist. In one embodiment, the first conduit 202 is substantially non-tortuous and free of bends or curves to an amount of less than about 10% by surface area. In another embodiment, the first conduit 202 is substantially non-tortuous and free of bends or curves to an amount of less than about 5% by surface area. In a particular embodiment, the first conduit 202 is substantially non-tortuous and free of bends or curves to an amount of less than about 1% by surface area. In one embodiment, the first conduit 202 of the heat exchanger is substantially linear. In a particular embodiment, first conduit 202 is substantially linear up to about 99%, up to about 95%, up to about 90%, up to about 85%, up to about 80%, and up to about 75%.

"Substantially free" of bends or "substantially linear" expressly allows the presence of trace amounts on non-linear surfaces and is not to be limited to a specified precise value, and may include values that differ from the specified value. In one embodiment, "substantially free" expressly allows the presence of trace amounts of non-linear surfaces. In a particular embodiment, "substantially free" expressly allows the presence of trace amounts of non-linear circumference, area, or volume, in respectively continuous or discrete fashion, such that the total circumference, area, or volume of a first conduit 202 is substantially non-tortuous and free of bends or curves by less than about 10%, by less than about 5%, by less than about 1%, by less than about 0.5%, and less than about 0.1%. "Substantially free" expressly allows the presence of the respective trace amounts of non-linear surfaces, etc. but does not require the presence non-linear surfaces, such as bends or curves.

Approximating language, as used herein throughout the specification and claims, may be applied to modify any quantitative or qualitative representation that could permissibly vary without resulting in a change in the basic function to which it is related. Accordingly, a value modified by a term such as "less than about" or "substantially free of" is not to be limited to a specified precise value, and may include values that differ from the specified value. In at least some instances, the approximating language may correspond to the precision of an instrument for measuring the value. Furthermore, "withdrawal of catalyst" may be used in combination with a term, and include a varying amount of withdrawn catalyst and is not to be limited to a specified precise value, and may include values that differ from a specified value.

The shape and size of the housing 204 or other parts of the heat exchanger 114 may vary and is adjustable based on intended use. In one embodiment of the heat exchanger 114, the housing 204 includes a tube maintained at a spaced apart relation from the first conduit 202. In another embodiment, the housing 204 includes a helical like structure wrapped or maintained at a spaced apart relation from the first conduit 202. In one embodiment, the first conduit 202 includes one or more protrusions 210 to hold the first conduit 202 in spaced apart relation relative to the housing 204. In one embodiment, the protrusion 210 is unattached to the housing 204 to allow the longitudinal expansion of the conduit 202 relative to the housing 204. In an example, conduit 202 may longitudinal expand up to about 10%. In another embodiment, the protrusion 210 is unattached to the conduit to allow the longitudinal expansion of the conduit 202 relative to the housing 204.

The shape and size of the protrusions 210 or housing 204 may also vary and is adjustable based on intended use. For illustration and not limitation, the protrusions 210 may be in the shape of a sphere, fiber, plate, cube, tripod, pyramid, rod, tetrapod, fins, studs, etc, either individually or in a combination thereof. In one embodiment, protrusions 210 include fins, studs or other geometric shape extending into the coolant volume 206 defined between the housing 204 and the first conduit 202 that increases the heat transfer area. Properties of each protrusions 210 are independent of any other protrusions 210. For example, the dimensions of each protrusion 210, including, for example, such dimensions as depth, width, length and shape, may independently vary from embodiment to embodiment and FIG. 2 depicts the protrusion 210 as studs or fins for illustration only. The size of the protrusions 210 also may vary and can depend on the type of heat exchanger and intended use.

In one embodiment, the heat exchanger 114 has an operational temperature range from about ambient to about 788° C. (1450° F.). The sliding seal 208 and the coupled protrusions 210 allow the first conduit 202 to expand longitudinally relative to the housing 204 over such operational temperatures. The heat exchanger 114 may further comprise a coolant air path 212 extending through the coolant volume. The coolant air path may be coupled to a blower 214, a source of plant air 216, or an eductor 218, either individually or in combination thereof.

The catalyst withdrawal apparatus 100 may also include a gas source 216 coupled to the first conduit 202 of the heat exchanger 114. The air or other gas source 216 may be utilized to fluidize, aerate and/or otherwise cool the withdrawn catalyst disposed in the vessel. The catalyst withdrawal apparatus 100 may also include a dynamic control valve 220 to control the amount of gas delivered from the gas source into the first conduit. In one embodiment, the flow of catalyst through heat exchanger 114 is maintained at average rate from about 5 ft/second to about 30 ft/second. In another embodiment, the flow of catalyst through heat exchanger 114 is at an average rate from about 5 ft/second to about 15 ft/second. In a particular embodiment, the flow of catalyst through heat exchanger 114 is at an average rate of 10 about ft/second, with a tolerance of up to about ±30%. In one embodiment, the flow of catalyst through heat exchanger 114 may have a standard deviation up to about ±30%, up to about 20%, and up to about 10%.

In one embodiment, the catalyst withdrawal apparatus 100 may include one or more metal filters 116 disposed between the vessel 102 and flow control circuit 108. A non-limiting advantage of the filter 116 may include preventing or minimizing abrasive materials such as catalyst from reaching the flow control circuit 108. The metal filter 116 may be a sintered metal or a woven metal mesh. In one embodiment, the metal filter 116 has a metallic surface. The metal filter 116 may include one or more metals, such as but not limited to, Au, Ag, Cu, Ni, Pd, Pt, Na, Al, and Cr, either individually or through any combination thereof. In another embodiment, the metal filter metal filter 116 may include iron, nickel, cobalt, manganese, tin, vanadium, nickel, titanium, chromium, manganese, cobalt, germanium, bismuth, molybdenum, antimony, and vanadium, either individually or in a combination of two or more thereof.

In a particular embodiment, the metal filter 116 comprises stainless steel. In a particular embodiment, the metal filter 116 comprises a woven stainless steel mesh filter. It should be appreciated that the metal filter 116 may include any other inorganic or organic material provided that includes a sufficient amount of metal to provide heat resistance. In one embodiment, the metal filter 116 comprises a sufficient amount of metal to withstand heat from the withdrawn catalyst. In one embodiment, the metal filter 116 is suitable for receiving catalyst having a temperature in excess of about 600° C. In yet another embodiment, the metal filter 116 is suitable for receiving catalyst at a temperature in a range from about 600° C. to about 850° C. In yet another embodiment, the metal filter 116 is suitable for receiving catalyst at a temperature in excess of about 800° C. In another embodiment, the metal filter 116 has an operational temperature at a range from about ambient to 705° C.

The shape and size of the metal filter 116 may also vary, depending on its composition and intended use. For example, the metal filter 116 may be in the shape of a sphere, fiber, plate, cube, tripod, pyramid, rod, tetrapod, or any non-spherical object. In one embodiment, the metal filter 116 is substantially rectangular. In one embodiment, air flow may be reversed to clean the metal filter 116 such that any trapped particulate in the metal filter 116 remains in the vessel 102.

In one embodiment, the catalyst withdrawal apparatus 100 includes one or more sensors 110 coupled to the vessel 102 and configured to provide a metric indicative of catalyst entering the vessel 102 through a metering device. Non-limiting examples of sensors, for illustration and not limitation, include a load cell, a differential pressure sensor, flow sensor, and a level sensor, either individually or in a combination thereof. The catalyst withdrawal apparatus 100 may be equipped with one or more sensors 110 that provide a metric indicative of a catalyst level within the regenerator of an FCCU 101. In the embodiment, the regenerator includes a first sensor and a second sensor configured to detect when the level of catalyst within the regenerator exceeds an upper or lower threshold. The sensor 110 may be a differential pressure measurement device, optical transducer, a capacitance device, a sonic transducer or other device suitable for providing information from which the level or volume of catalyst disposed in the regenerator may be resolved. For example, if the first sensor provides an indication to a controller that the catalyst level is low, the controller may initiate a catalyst injection by the catalyst injection system. If the second sensor provides an indication to the controller that the catalyst level is high, the controller may initiate a catalyst withdrawal from the FCC unit by the catalyst withdrawal apparatus 100, or otherwise increase the rate of withdrawal.

In one embodiment, the catalyst withdrawal apparatus 100 includes one or more sensors 110 for providing a metric suitable for resolving the amount of catalyst passing through a metering device during each withdrawal of catalyst from the regenerator of an FCCU 101. The sensor or plurality of sensors may be configured to detect the level (i.e., volume) of catalyst, the weight of catalyst, and/or the rate of catalyst movement through at least one or more of the following: the vessel, in let, outlet, regenerator, or the metering device. Non limiting examples of sensors 110 configured to detect such include load cell, a differential pressure sensor, flow sensor, and a level sensor, either individually or in a combination thereof.

In an embodiment as depicted in FIG. 1, the sensor 110 includes a plurality of load cells 112 adapted to provide a metric indicative of the weight of catalyst in a vessel 102. The load cells 112 are respectively coupled to a plurality of legs that support the vessel above a surface such as a concrete pad. Each of the legs has a load cell coupled thereto. The controller 120 receives the outputs of the load cells and utilizes sequential data samples obtained therefrom to resolve the net amount of withdrawn catalyst after each actuation of the metering device. Data samples are also taken after actuation of the outlet valve such that the true amount of catalyst withdrawn from the FCC unit 101 through the catalyst withdrawal apparatus 100 may be accurately determined. Additionally, the net amount of catalyst withdrawn over the course of the production cycle may be monitored so that variations in the amount of catalyst dispensed in each individual shot may be compensated for by adjusting the delivery attributes of the metering device, for example, changing the open time of the flow control circuit 108 to allow more (or less) catalyst to pass therethrough and be removed from the unit 101.

In another embodiment, the sensor 110 includes a level sensor coupled to the vessel 102 and adapted to detect a metric indicative of the level of catalyst within the vessel. The level sensor may be a differential pressure measuring device, an optical transducer, a capacitance device, a sonic transducer or other device suitable for providing information from which the level or volume of catalyst disposed in the vessel may be resolved. By utilizing the sensed difference in the level of catalyst disposed in the vessel after dispenses, the amount of catalyst removed from the regenerator may be resolved for a known vessel geometry.

In yet another embodiment, the sensor 110 includes a flow sensor adapted to detect the flow of catalyst through one of the components of the catalyst withdrawal apparatus 100. The flow sensor maybe a contact or non-contact device and may be mounted to the vessel, the metering device or the conduit coupling the vessel to a waste container. For example, the flow sensor may be a sonic flow meter or capacitance device adapted to detect the rate of entrained particles (i.e., catalyst) moving through the delivery line.

Another embodiment of the catalyst withdrawal apparatus 100 includes one or more vessels 102, one or more delivery lines 118 and one or more control valves 220. The vessel 102 has one or more inlets 104 coupled to the unit 101 and one or more outlets 106. The delivery line 118 is coupled to the inlet 104 for delivering catalyst to the vessel 102. The control valve 220 is configured to control the amount of gas to the delivery line 118 and entrained with the catalyst. In a particular embodiment, the catalyst withdrawal apparatus 100 optionally includes one or more heat exchanger 114 and or one or more flow control circuits 108 coupled to the vessel 102. It should be appreciated that the catalyst withdrawal apparatus 100 and methods of such may be used to withdraw material from a unit 101 with lower temperature applications than an FCCU. When the catalyst withdrawal apparatus 100 is used in units or processes with lower temperature applications than an FCCU, a heat exchanger may not be necessary and is optional.

Another embodiment of the catalyst withdrawal apparatus includes one or more vessels 102 and one or more heat exchangers 114 coupled to the vessel. The vessel 102 is suitable for high temperature operation and has one or more inlets 104 coupled to the unit 101 and one or more outlets 106. In a particular embodiment, the catalyst withdrawal apparatus 100 optionally includes one or more control valves 220 and one or more flow control circuits 108 coupled to the vessel 102.

Embodiments of the heat exchanger 114 include, but are not limited to, as described above. In one embodiment of the heat exchanger 114, a housing 204 confines a coolant volume 206 around at least a portion of the first conduit 202; and a sliding seal 208 seals the housing 204 to the first conduit 202 in a manner that allows the first conduit 202 to expand longitudinally relative to the housing 204. Non-limiting embodiments of sliding seals 208 are described in FIG. 3-5.

FIG. 3. includes an embodiment of the sliding seal 208. The sliding seal 208 includes a seal housing 304, a retainer 306, and a seal 308. The seal housing 304 is coupled to an end cap 302.

FIG. 4 includes another embodiment of a sliding seal 400. The sliding seal 400 couples a first portion 402 of the housing to a second portion 404 of the housing. The sliding seal 400 includes a sleeve 406, seal housing 408, a retainer 410, and a seal 412. The sleeve 406 is welded, brazed or otherwise fastened or connected in a substantially leak free manner to the first portion 402 of housing. The seal housing 408 is coupled to the sleeve 406. The retainer 410 is threaded into the seal housing 408 to retain the seal against the first conduit 202.

FIG. 5. includes another embodiment of a sliding seal 500. The sliding seal includes one or more bellows 502. The bellows 502 couples the first portion 402 of the housing to the second portion 404 of the housing.

It should be appreciated that the catalyst withdrawal apparatuses 100 described above may be configured to withdraw material from one or more units 101. Catalyst withdrawal apparatus 100 may remove catalyst from one or more of such units 101, simultaneously or sequentially. In one embodiment, the catalyst withdrawal apparatus 100 may remove catalyst from a plurality of units 101, wherein the units may be the same or differ from each other.

In a particular embodiment, the catalyst withdrawal apparatus 100 may be configured to withdraw material from one or more units 101 that are FCC units. The FCC unit is adapted to promote catalytic cracking of petroleum feed stock provided from a source and may be configured in a conventional manner. One example of a material withdrawal apparatus that may be adapted to benefit from the invention is described in U.S. Pat. No. 7,431,894 filed Jul. 19, 2005, which is incorporated by reference in its entirety.

It should be appreciated that the catalyst withdrawal apparatus 100 described above and methods described below may apply to many types of units as well, such as but not limited to, fluidized bed combustors in the power industry, fluidized bed system with lower temperature applications, fixed bed or moving bed unit, bubbling bed unit, unit suitable for the manufacture of pyridine and its derivatives, unit suitable for the manufacture of acrylonitrile, unit operated at a low oxygen environment condition, low oxygen environment condition such as but are not limited to partial burn partial combustion, mixed mode FCC, full combustion FCC with poor air circulation, etc., and other units suitable for industrial processes, etc., either individually or in a combination of two or more. For example, the catalyst withdrawal apparatus 100 may be configured to withdraw material from units designed to crack gasoline into Liquefied Petroleum Gas (LPG) such as but not limited to Superflex™ process or crack heavy feed into LPG instead of gasoline such as but not limited to Indmax™ process. In another embodiment, the catalyst withdrawal apparatus 100 may be configured to withdraw material from a unit 101 for processing acrylonitrile. An example of a unit 101 suitable for the manufacture of acrylonitrile is a fluidized bed process. Similar units are also used for manufacturing other chemicals such as pyridine.

The embodiments of the catalyst withdrawal apparatus 100 are configured to withdraw various materials and embodiments of the invention are not limited by what material is being withdrawn or the form of the material being withdrawn. Non-limiting examples of materials that are withdrawn may be referred as and include catalyst, product, powder, additive, equilibrium spent catalyst, and catalyst fines, either individually or in a combination of two or more. Examples of compositions of material include but are not limited to alumina, silica, zirconia, aluminosilicates, etc., either individually or in a combination of two or more. Non-limiting examples of the form of material include liquid, powder, formed solid shapes such as microspheres, beads, and extrudates, either individually or in a combination of two or more forms.

Figure 6:
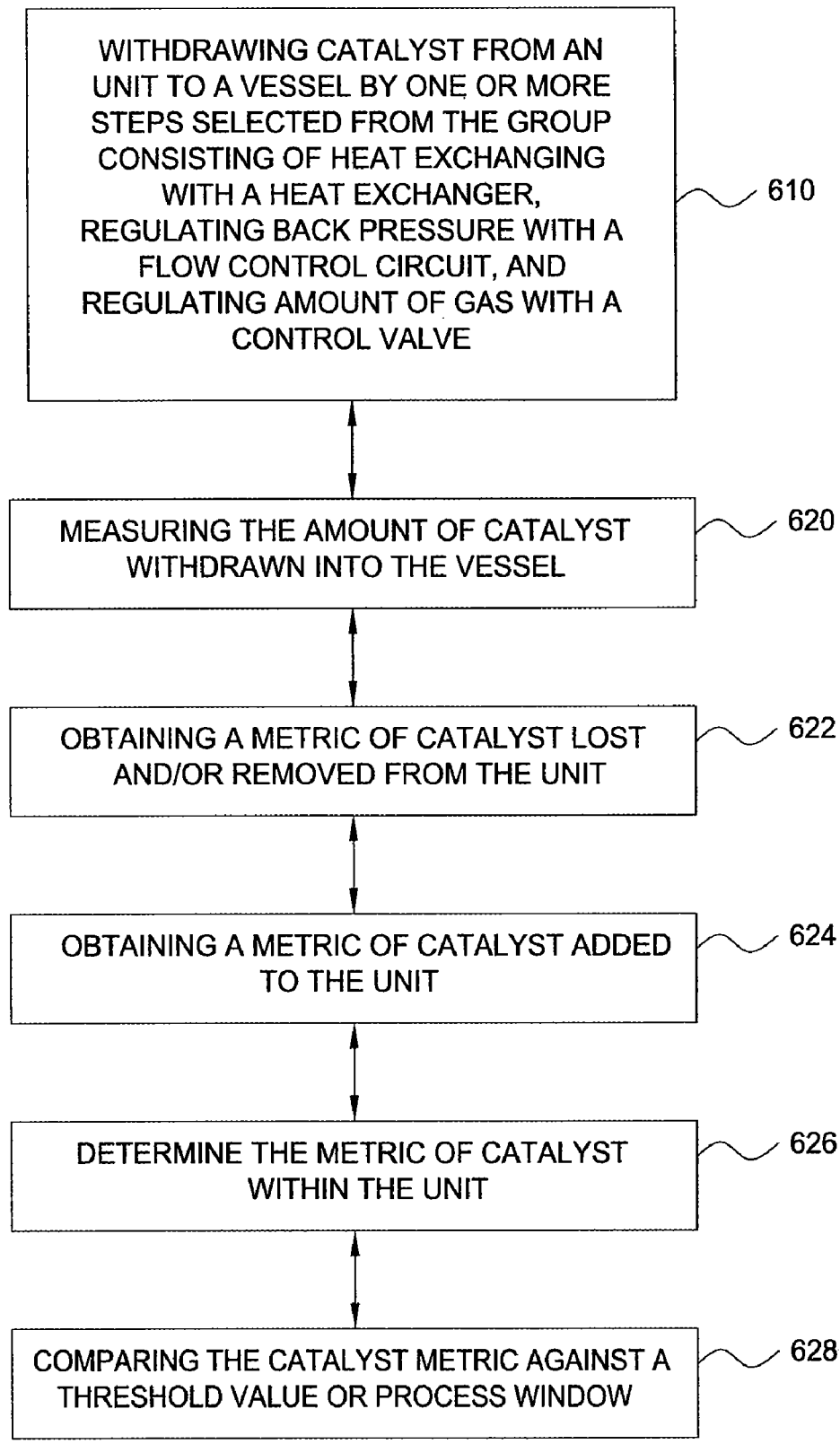
FIG. 6 is a flow diagram of a method of regulating catalyst in a unit in accordance with an embodiment of the present invention.

With reference to FIG. 6, next is depicted a method of withdrawing one or more catalyst from one or more units 101. The method includes a step 610 of one or more the following, either individually or in a combination thereof: withdrawing catalyst from one or more units to a vessel by heat exchanging with one or more heat exchangers 114; regulating back pressure with one or more flow control circuits 108; and or regulating amount of gas flow with one or more control valves 220 configured to control the amount of gas to the delivery line 118 and entrained with the catalyst. In one embodiment, the method includes heat exchanging with one or more heat exchangers 114 as described above. In another embodiment, the method includes dynamically regulate backpressure within the vessel with one or more flow control circuits 108. In another embodiment, the method includes regulating amount of gas flow with a control valve 220 configured to control the amount of gas to the delivery line and entrained with the catalyst.

The method is not limited by a sequence of when and how heat exchanging with a heat exchanger, regulating back pressure with a flow control circuit, and regulating amount of gas with a control valve occur. Step 610 may include the individual step of heat exchanging with a heat exchanger, regulating back pressure with a flow control circuit, and regulating amount of gas with a control valve or the sequential or simultaneous combinations thereof. In one embodiment, heat exchanging with a heat exchanger occurs before, during or after optionally regulating back pressure with a flow control circuit, and regulating amount of gas with a control valve. In another embodiment, regulating back pressure with a flow control circuit occurs before, during or after optionally heat exchanging with a heat exchanger and regulating amount of gas with a control valve. In another embodiment, regulating amount of gas with a control valve occurs before, during or after optionally heat exchanging with a heat exchanger or regulating back pressure with a flow control circuit.

The method is also not limited by the frequency of heat exchanging with a heat exchanger, regulating back pressure with a flow control circuit, and regulating amount of gas with a control valve. The method is also not limited by the form of the heat exchanger, flow control circuit, control valve. Examples of the form of heat exchanger, flow control circuit, control valve include, but are not limited to, are described above.

The method also includes an optional step 620 of measuring the amount of catalyst withdrawn from the one or more units 101 into a vessel 102. The step 620 of measuring the amount of catalyst withdrawn into the vessel may be performed by a metering device. Optionally, in an embodiment, step 620 metering may be executed by a step 622 of obtaining a metric of catalyst lost and/or removed from the unit. The metric of catalyst lost may be a predefined value such as based on empirical data, calculated data, or may be provided real time and/or as an updated metric. Examples of updated and/or provided metrics include a metric of catalyst entrained in the product stream at the distiller, catalyst exiting the regenerator through the exhaust system, catalyst removed from the metered withdrawal system, among others.

At step 624, a metric of catalyst additions are obtained. The metric of catalyst addition are typically attained from the catalyst addition system, in the form of catalyst and/or additives added to the unit.

At step 626, a metric of the amount of catalyst within the unit is determined. In one embodiment, the amount of catalyst is determined by summing the catalyst additions of 624 minus the catalyst removed from the system obtained at step 622. The determination of catalyst within the unit may be made from data obtained over a predetermined period of time. The predetermined period of time may be in fractions of an hour, hourly, daily or over other time periods. The determination of catalyst within the unit may be made from data obtained real time, for example, by monitoring a data stream such as regenerator bed level. As the process described above is iterative, the total catalyst determined may, alternatively, be calculated by subtracting the catalyst removed over the period from the last determination and adding the catalyst added over the same period.

Optionally, at step 628, the catalyst amount is compared against a threshold value or process window. If the determined catalyst is outside of a predefined process window (or exceeds the threshold), appropriate catalyst additions or withdrawals are made. This cycle of monitoring the amount of catalyst is repeated in order to maintain the dynamic catalyst equilibrium in a unit, such as an FCC unit. Advantageously, this allows the FCC unit or any other unit to continue operating at or near processing limits with minimal fluctuation, thereby providing the desired product mix and emissions composition with minimal dis-optimisation, thereby maximizing the profitability of the FCC system refiner.

Optionally, a controller 120 is provided to control the function of at least the withdrawal apparatus 100. The controller 120 generally includes a processor, support circuits and memory. The controller 120 may be any suitable logic device for controlling the operation of the catalyst withdrawal apparatus 100. In one embodiment, the controller 120 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 120.

The controller 120 is coupled to various support circuits that provide various signals to the controller 120. These support circuits include, power supplies, clocks, input and output interface circuits and the like. Other support circuits couple to the flow control circuit 108, the control valve 220, and the like, to the controller 120. In one embodiment, the controller 120 controls the actuation of the control valve 220 such that the flow through the delivery line 118 and/or first conduit 202 of the heat exchanger 114 is maintained a rate that provides good heat transfer and substantially prevents the catalyst from settling out of the flow with in the line 118 and/or conduit 202, while minimizing the abrasive, sandblasting effect, of the entrained catalyst, such as the rates described above. In another embodiment, the controller 120 controls the actuation of one or more valves comprising the fluid control circuit 108 such that backpressure with in the vessel 102 may be regulated in a manner that controls the flow of catalyst within the delivery line 118 from the unit 101 and into the vessel 102.

In another embodiment of a method for regulating catalyst within a unit, the withdrawal system may be set to remove a predefined amount of catalyst over a predefined period of time. For example, the catalyst withdrawal apparatus 100 or method may be operated or set to remove a target withdrawal of about 4 tons of catalyst per day. The withdrawal may be made in predetermined increments, such that a total withdrawal amount will be made over the predefined period and may be adjustable and variable for the type and number of units. In an embodiment, the operator may manually initiate withdrawals from the regenerator using the system. For example, the operator may initiate a withdrawal in response to the catalyst bed level within the regenerator, such as provided by information obtained by the sensor. The manual withdrawal may be made in addition to the target withdrawal, or count against the target withdrawal for that time period.

It will be apparent to those skilled in the art that various modifications and variations can be made in the systems and methods of the present invention without departing from the spirit or scope of the invention. Thus, it is intended that the present invention include modifications and variations that are within the scope of the appended claims and their equivalents.

While the invention has been described in detail in connection with only a limited number of aspects, it should be understood that the invention is not limited to such disclosed aspects. Rather, the invention can be modified to incorporate any number of variations, alterations, substitutions or equivalent arrangements not heretofore described, but which are commensurate with the scope of the claims. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:

1. A catalyst withdrawal apparatus for removing catalyst from at least a unit, comprising:
   a vessel suitable for high temperature operation, the vessel having an inlet coupled to the unit and an outlet; and
   a flow control circuit configured to dynamically regulate pressure within the vessel.

2. The catalyst withdrawal apparatus of claim 1, further comprising:
   a sensor coupled to the vessel arranged to provide a metric indicative of the amount of catalyst entering the vessel through a metering device.

3. The catalyst withdrawal apparatus of claim 1, further comprising:
   a heat exchanger, wherein the heat exchanger comprises:
   a first conduit;
   a housing confining a coolant volume around at least a portion of the first conduit; and
   a sliding seal sealing the housing to the first conduit in a manner that allows the first conduit to expand longitudinally relative to the housing.

4. The catalyst withdrawal apparatus of claim 3, wherein the housing comprises a tube maintained at a spaced apart relation from the first conduit.

5. The catalyst withdrawal apparatus of claim 3, wherein the first conduit comprises at least a protrusion to hold the first conduit at a spaced apart relation relative to the housing.

6. The catalyst withdrawal apparatus of claim 5, wherein the protrusion comprises a member selected from a group consisting of a fin, a stud, and combinations thereof.

7. The catalyst withdrawal apparatus of claim 3, wherein the heat exchanger further comprises a coolant air path extending through the coolant volume, wherein the coolant air path is coupled to a member selected from a group consisting of a blower, a source of plant air, an eductor, and combinations thereof.

8. The catalyst withdrawal apparatus of claim 3, further comprising:
   a gas source coupled to the first conduit of the heat exchanger.

9. The catalyst withdrawal apparatus of claim 8, further comprising a dynamic control valve to control the amount of gas from the gas source into the first conduit.

10. The catalyst withdrawal apparatus of claim 1, further comprising a metal filter disposed between the vessel and flow control circuit.

11. A catalyst withdrawal apparatus for removing catalyst from at least a unit, comprising: a vessel having an inlet coupled to the unit and outlet; a delivery line coupled to the inlet for delivering catalyst to the vessel; a control valve configured to control the amount of gas to the delivery line and entrained with the catalyst; and a flow control circuit configured to dynamically regulate pressure, within the vessel.

12. The catalyst withdrawal apparatus of claim 11, wherein the vessel is coupled to a heat exchanger.

13. The catalyst withdrawal apparatus of claim 12, wherein the heat exchanger comprises:
   a first conduit;
   a housing confining a coolant volume around at least a portion of the first conduit; and
   a sliding seal sealing the housing to the first conduit in a manner that allows the first conduit to expand longitudinally relative to the housing.

14. The catalyst withdrawal apparatus of claim 13, further comprising a gas source coupled to the first conduit of the heat exchanger.

15. The catalyst withdrawal apparatus of claim 14, further comprising a dynamic control valve to control the amount of gas from the gas source into the first conduit.

16. The catalyst withdrawal apparatus of claim 11, further comprising a metal filter coupled to the vessel.

17. The catalyst withdrawal apparatus of claim 11, further comprising
   a sensor coupled to the vessel configured to provide a metric indicative of the amount of catalyst entering the vessel through a metering device.

18. A catalyst withdrawal apparatus for removing catalyst from at least a unit, comprising: a vessel having an inlet coupled to the unit and an outlet; heat exchanger coupled to the vessel, wherein the heat exchanger comprises: a tint conduit; a housing confining a coolant volume around at least a portion of the first conduit; a sliding seal sealing the housing to the first conduit in a manner that allows the first conduit to expand longitudinally relative to the housing; and a flow control circuit configured to dynamically regulate pressure, within the vessel.

19. The catalyst withdrawal apparatus of claim 18, further comprising:
- a delivery line coupled to the inlet for delivering catalyst to the vessel; and
- a control valve configured to control the amount of gas to the delivery line and entrained with the catalyst.

20. The catalyst withdrawal apparatus of claim 18, further comprising
- a sensor coupled to the vessel arranged to provide a metric indicative of catalyst entering the vessel through a metering device.

21. The catalyst withdrawal apparatus of claim 18, further comprising a gas source coupled to the first conduit of the heat exchanger.

22. The catalyst withdrawal apparatus of claim 21, further comprising a dynamic control valve to control the amount of gas from the gas source into the first conduit.

23. The catalyst withdrawal apparatus of claim 18, further comprising a metal filter connected to the vessel.

* * * * *